(12) United States Patent
Okubo et al.

(10) Patent No.: US 8,676,415 B2
(45) Date of Patent: Mar. 18, 2014

(54) ENGINE POWER DEMAND LOAD-LEVELING FOR A HYBRID ELECTRIC VEHICLE

(75) Inventors: Carol Louise Okubo, Belleville, MI (US); Christopher Alan Lear, Dearborn, MI (US); Kenneth Frederick, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1068 days.

(21) Appl. No.: 12/483,285

(22) Filed: Jun. 12, 2009

(65) Prior Publication Data

US 2010/0017054 A1    Jan. 21, 2010

Related U.S. Application Data

(60) Provisional application No. 61/082,353, filed on Jul. 21, 2008.

(51) Int. Cl.
*B60W 10/04* (2006.01)
*B60W 10/24* (2006.01)
*B60W 10/26* (2006.01)
*G06F 17/00* (2006.01)
*G06F 19/00* (2011.01)

(52) U.S. Cl.
USPC ............ 701/22; 701/70; 701/94; 180/65.265; 180/65.29

(58) Field of Classification Search
USPC ............ 701/1, 22, 36, 51, 54, 70, 93, 94, 99; 180/65.21, 65.245, 36.25, 65.26, 180/65.265, 65.28, 65.285, 65.29, 65.25
See application file for complete search history.

(56) References Cited

U.S. PATENT DOCUMENTS

| | | | |
|---|---|---|---|
| 6,054,844 | A | 4/2000 | Frank |
| 6,173,574 | B1 | 1/2001 | Obayashi et al. |
| 6,278,915 | B1 | 8/2001 | Deguchi et al. |
| 6,437,456 | B1 | 8/2002 | Kimura et al. |
| 2005/0173169 | A1 | 8/2005 | Gray, Jr. |

OTHER PUBLICATIONS

Office Action dated Aug. 19, 2013 for corresponding Chinese Application 200910152160.7 filed Jul. 20, 2009.

*Primary Examiner* — Thomas Tarcza
*Assistant Examiner* — Edward Pipala
(74) *Attorney, Agent, or Firm* — David B. Kelley; Brooks Kushman P.C.

(57) ABSTRACT

A method for controlling a demand for engine power in a control for an engine in a hybrid electric vehicle with power-split characteristics. Following transitions from acceleration or deceleration operating modes to a steady-state operating mode, power demand excursions from road-load power are attenuated or avoided by filtering the power demand using a filter constant that changes within battery power constraints as a function of a normalized driver demand for power at traction wheels for the vehicle.

14 Claims, 3 Drawing Sheets

ENGINE POWER DEMAND LOAD-LEVELING FOR A HYBRID ELECTRIC VEHICLE

CROSS-REFERENCE TO RELATED APPLICATIONS

This application claims the benefit of U.S. provisional application Ser. No. 61/082,353, filed Jul. 21, 2008.

BACKGROUND OF THE INVENTION

1. Field of the Invention

The invention relates to control of power from an engine in a hybrid electric vehicle powertrain wherein engine power demand is determined by road-load.

2. Background Art

In a hybrid electric vehicle powertrain (HEV), particularly a power-split hybrid electric vehicle powertrain with a divided power flow path from an engine and an electric motor, the path has two power input gear elements and one power output element. Two of the gear elements have definite rotation directions and magnitudes, which determine the rotation direction and magnitude of the third element. One of the elements can be kept at a constant speed, while the other elements can change. This is a characteristic that is similar to a characteristic of a conventional continuously variable transmission. Unlike a conventional continuously variable transmission, however, the torque relationship of the gear elements is fixed even though the speed relationship can be changed.

In a so-called power-split hybrid electric vehicle powertrain of the kind shown, for example, in U.S. Pat. No. 6,994,360, selection of engine speed and operation of the engine throttle is based upon an engine power demand. This engine power demand is calculated by a vehicle system controller and is based primarily upon a driver demanded wheel power. Typically, driver demanded wheel power is measured by accelerator pedal input, or an input from a speed control system. It is based also on a high voltage battery state-of-charge. Given an engine power demand, the vehicle system controller selects an engine speed and an engine torque to achieve engine power demand while optimizing fuel economy and minimizing vehicle emissions.

The CVT-like nature of a power-split HEV allows the vehicle to operate in a significant range of engine speeds at any given vehicle speed. As a result of the optimization for fuel economy, the targeted engine speed is quite sensitive to small changes in driver demanded wheel power. However, transient engine power demand conditions caused by frequent, small changes in engine operating point may reduce fuel economy, increase vehicle emissions, and result in a negative driver perception of engine speed hunting or instability.

Transient conditions may be reduced by filtering the engine power demand with a simple filter. However, such a filter will also negatively affect vehicle performance by delaying the engine's response to an acceleration or deceleration request.

SUMMARY OF AN EMBODIMENT OF THE INVENTION

The method of the control system of an embodiment of the invention provides a steady engine operating point when the driver is attempting to maintain a constant vehicle speed. It also provides a fast response to a driver's attempt to accelerate or decelerate the vehicle. To distinguish between steady-state and transient conditions, the driver demanded power is compared with the road-load power. When the driver demanded power is above the road-load power, the vehicle will accelerate. When it is less than the road-load power, the vehicle will decelerate.

The vehicle is considered to be at steady-state when the driver demanded power is less than a maximum power for filtering and greater than a minimum power for filtering. The road-load power is calculated based upon the vehicle coast-down coefficients (friction loss and aerodynamic drag, as a function of vehicle speed), and compensated for inferred grade of the road. Power demand is compared to road-load. The difference is filtered using a filter constant that is based on a normalized function of the difference.

PARTICULAR DESCRIPTION OF AN EMBODIMENT OF THE INVENTION

Figure 1:
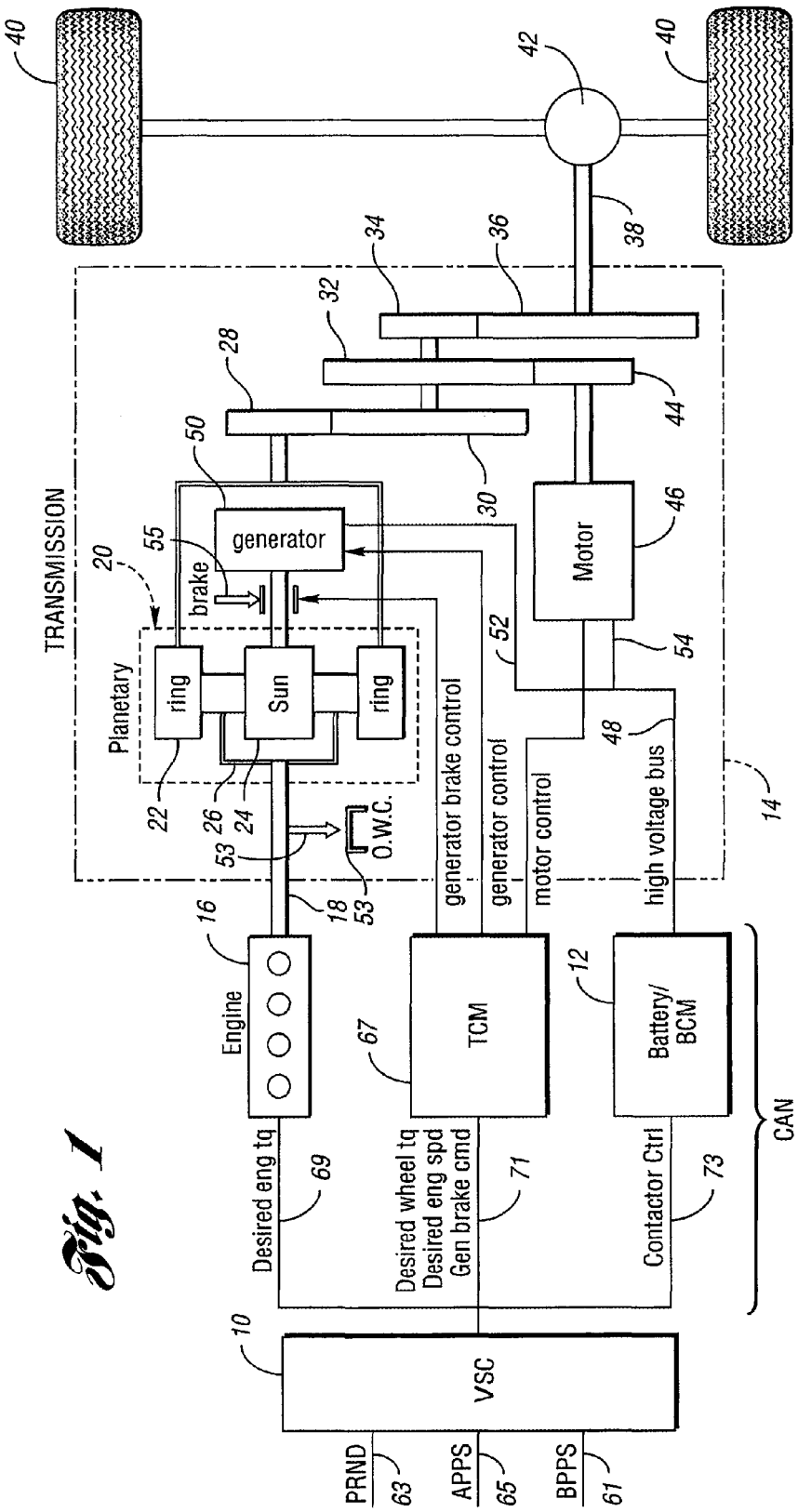
FIG. 1 is a schematic representation of a hybrid electric vehicle powertrain capable of embodying the improvements of the invention.

A hybrid electric vehicle powertrain capable of using the method of one embodiment of the invention has a configuration, as shown in FIG. 1. A vehicle system controller 10, a battery module 12 and a transaxle control module 14, comprise a control area network (CAN). An engine 16, controlled by controller 10, distributes torque through torque input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A torque output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery 12 delivers electric power to the motor through power flow path 48. Generator 50 is connected electrically to the battery and to the motor in known fashion, as shown at 52.

When the powertrain battery 12 is acting as a sole power source with the engine off, the torque input shaft 18 and the carrier assembly 26 are braked by an overrunning coupling 53. A mechanical brake 55 anchors the rotor of generator 50 and the sun gear 24 when the engine is on and the powertrain is in a parallel drive mode, the sun gear 24 acting as a reaction element.

In FIG. 1, the vehicle system controller 10 receives a signal from a transmission range selector 63, which is distributed to transmission control module 67, together with a desired wheel torque, a desired engine speed and a generator brake command, as shown at 71. A battery contactor or switch 73 is closed after vehicle "key-on" startup. The controller 10 issues a desired engine torque request to engine 16, as shown at 69, which is dependent on accelerator pedal position sensor output 65.

A brake pedal position sensor distributes a wheel brake signal to controller, as shown at 61. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system including the motor, the generator and the battery, where the battery acts as an energy storage medium for the generator and the motor.

Figure 2:
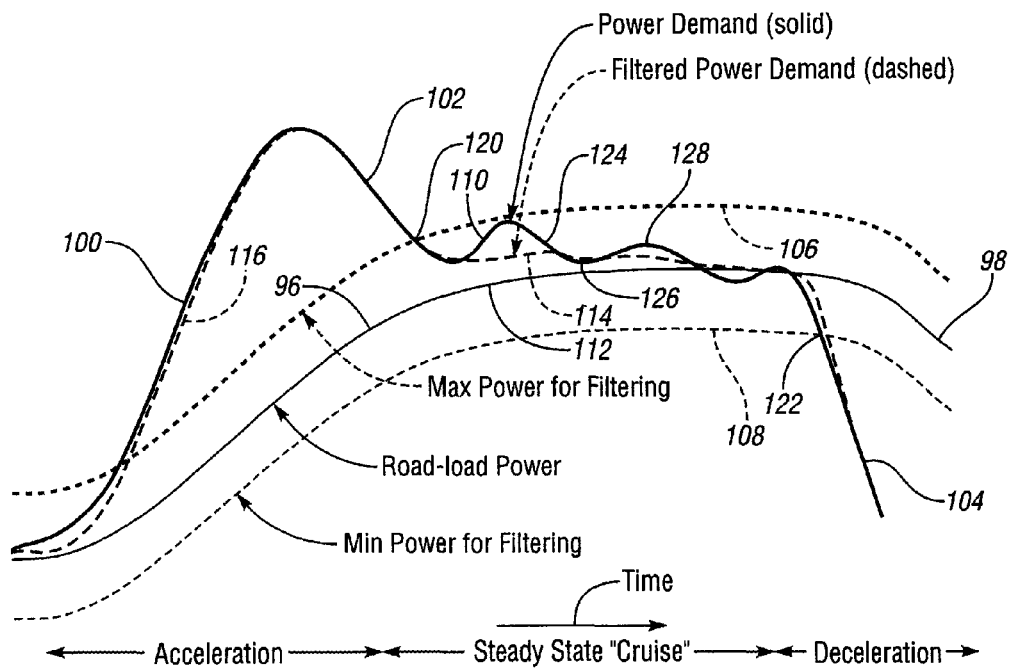
FIG. 2 is a plot of the relationship between engine power demand and driver demanded wheel power.

During steady-state conditions, a filter is applied to the engine power demand calculation with the intent to drive the engine power demand to the road-load (see FIG. 2). Any difference between the engine power demand and the driver demanded wheel power is supplied by the high voltage battery. Thus, the region around the road-load power in which the engine power demand is driven to the road-load power is a function of the available battery charge and discharge power. If the engine operating point is in the part of the region above the road-load power curve and below the maximum power for filtering, the battery needs charging. If it is below the road low power curve and above the minimum power for filtering, the battery needs to be discharged.

FIG. 2 is a time plot showing a vehicle driving event in which road-load power is plotted as shown at 96 over a given time period. During acceleration, the road-load power will increase from a low value at the beginning of an acceleration period to a high value during a steady-state cruise mode. When the vehicle decelerates, the road-load will decrease as shown at 98. Acceleration of the vehicle occurs as the driver demand for power increases. This is shown in FIG. 2 at 100. As the driver relaxes the engine throttle, the driver demand for wheel power decreases as shown at 102. At that time, the vehicle will enter a steady-state cruise mode. Finally, the driver demand for power at the wheels decreases as the vehicle decelerates as shown at 104.

Maximum power for filtering the power demand during steady-state cruise operation is plotted at 106 and the minimum power for filtering the power demand is shown at 108. The maximum power for filtering and the minimum power for filtering are computed by the vehicle system controller during each controller control loop or time step.

The vehicle system controller may be a microprocessor of known design in which data points on the plot 106 and data points on the plot 108 are determined during each control loop of the microprocessor. The distance between a data point 110 on the power demand plot and a data point 112 on the road-load power plot is an indication of a small change in driver demand for wheel power, which would result in small changes in the engine operating points. Such changes tend to create changes in engine speed, which may be perceptible by the vehicle operator. It is desirable, therefore, to reduce the magnitude and duration of changes in the driver wheel power demand using the filtering technique of the present invention and to drive the power demand point toward a filtered power demand value on the plot 96 as shown at 114.

The size of the zone between the maximum power for filtering plot 106 and the minimum power for filtering plot shown at 108 is a function of battery SOC and SOC upper and lower limits. Before the filtering zone is entered at 120, a filtering of the power demand occurs, as shown at 116, where acceleration occurs. The filtered power demand curve is substantially coincident with the unfiltered power demand curve 100 since the filter constant at that time is unchanging so that the filter acts as a common pass-through filter with no effect on the power demand. As the power demand plot enters the filtering zone at 120, the filter constant changes from a fast value to a slow value, thereby forcing the power demand plot toward the road-load power plot. This is shown in FIG. 2 at 124. An over-shoot in the plot of power demand may occur as shown at 126, but a reversal in the magnitude of the filter constant during a subsequent control loop will correct the over-shoot, as shown at 128. This process continues until the steady-state cruise mode terminates at point 122.

The maximum power for filtering curve in FIG. 2 is determined by computing during each control loop a maximum power value as a simple function of battery state-of-charge (SOC) and battery charge and discharge power limits. This is shown in FIG. 2. In a similar fashion, the minimum power for filtering curve is computed during each control loop as a function of battery SOC and battery charge and discharge power limits.

The road-load power plot 96 is calculated using variables including vehicle coast down coefficients such as friction loss and aerodynamic drag as a function of speed, as previously mentioned.

Figure 3:
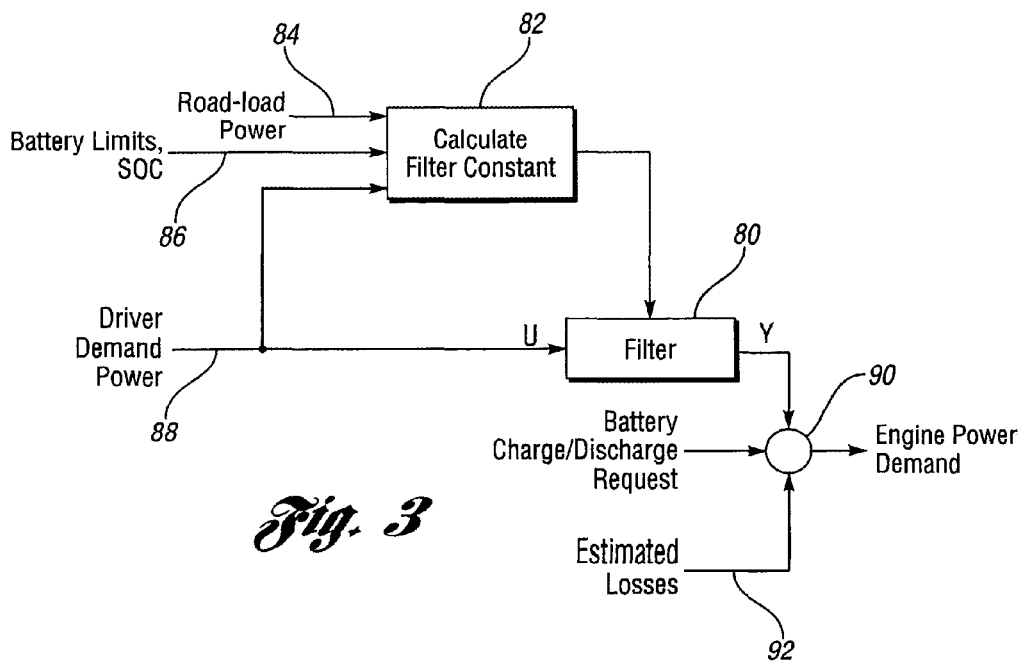
FIG. 3 is a flowchart showing the engine power demand calculation, which includes the filter for causing the engine power demand to become equal to road-load.

The filter constant for the filter shown at 80 in FIG. 3 is calculated at step 82. The inputs for the calculation occurring at 82 are road-load power 84, and battery state-of-charge and battery limits 86. The driver demand power at 88 and road-load power 84 are compared and any difference is supplied by the battery charge or discharge request, as shown at 90. Estimated losses in the system are taken into account, as shown at 92, in calculating engine power demand.

Figure 4:
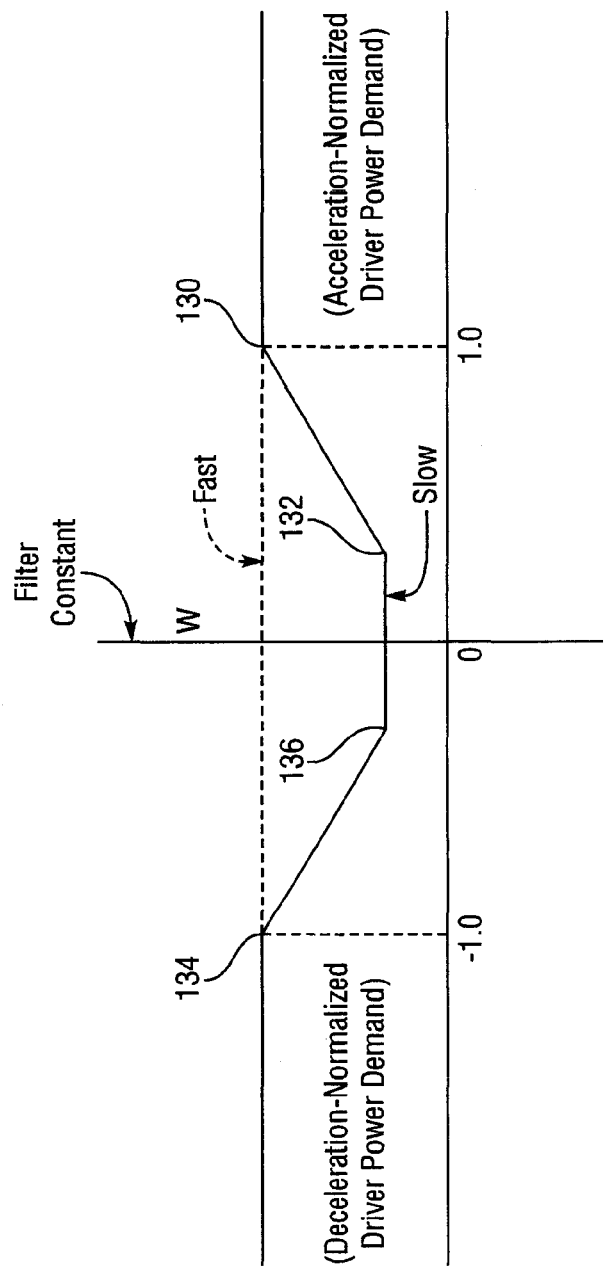
FIG. 4 shows a plot for determining a filter constant.

FIG. 4 shows a plot for determining a filter constant, which can change during each control loop of a vehicle system controller. The filter constant is shown at W. The filter constant is fast during the acceleration mode. This is shown at 130 in FIG. 4. During a transition from the acceleration mode to the steady-state mode, the filter constant decreases in value until a slow value at 132 is computed. If the vehicle is decelerating, the filter constant will change from a fast value at 134 to a slow value at 136. During operation in the steady-state cruise mode, the filter constant will change to values between 130 and 134.

During operation in the steady-state cruise mode, a normalized value for driver demand at the wheels is used in determining a filter constant. It is computed as follows:

If driver demand>roadload, then:
normalized driver
demand for power $$\text{at the wheels} = \frac{P_{driver} - P_{road\ load}}{P_{max} - P_{road\ load}}; \text{ and}$$

If driver demand<roadload, then:
normalized driver
demand for power $$\text{at the wheels} = \frac{P_{driver} - P_{road\ load}}{P_{max} - P_{min}}; \text{ and}$$

The normalized value is 1.0 when $P_{driver}$ is at the upper limit, $P_{max}$. It is zero when $P_{driver}$ is at roadload. It is −1.0 when $P_{driver}$ is at the lower limit.

In FIG. 3, the output signal for the filter 80 is shown at Y. That value is combined with the battery charge or discharge request and the estimated losses as shown at 90 to determine the engine power demand. The value Y seen in FIG. 3 is computed as follows:

$$y(k) = w\left(\frac{u(k) + u(k-1)}{2}\right) + (1-w)Y(k-1)$$

where:
Y=output
u=Driver Demand Power
k=time step between control loops
w=Filter Constant In summary, the calculation of the filter constant is determined by the following procedure:

First, if the driver demand is approaching the road-load power, the filter is a pass-through filter. This allows the engine power demand to approach the road-load power as quickly as possible.

Secondly, if the driver demand is moving away from the road-load power, the filter constant is calculated as a function of the distance to the road-load power. This allows heavy filtering during a steady-state cruise and little or no filtering when the vehicle is accelerating or decelerating.

Thirdly, the distance to the road-load power is normalized by the size of the region around the road-load power in which filtering is desired. This is demonstrated in FIG. 2 where the maximum and minimum power for filtering is plotted together with road-load power. This allows the calibration of the filter constant to be independent of the size of the region around the road-load, which changes as a function of battery charge and discharge power limits and battery state-of-charge.

The road-load power is used to activate or deactivate the filter. In contrast, a simple filter or rate limit of conventional design during changes to the engine power demand would be active under all operating conditions.

Control of the amount of battery power used also is made possible by the present invention. The amount of battery charging or discharging resulting from the filter is limited to the size of the region around the road-load power. In contrast, a simple filter or rate limit on changes to the engine power demand could result in large battery power excursions during transient power changes.

Normalizing power demand is carried out by using the size of the band around the road-load plot, which reduces such excursions and simplifies calibration.

Although an embodiment of the invention has been disclosed, it will be apparent to persons skilled in the art that modifications may be made without departing from the scope of the invention. All such modifications and equivalents thereof are intended to be defined by the following claims.

What is claimed:

1. A method for a vehicle having an engine, a battery, and a controller, comprising:
   computing available battery power constraints using the controller;
   computing a filter constant using the controller that changes within the battery power constraints as a function of a difference between driver demand for power and road-load power; and
   filtering power demand using the filter constant during steady-state vehicle operation when the driver attempts to maintain constant vehicle speed.

2. The method set forth in claim 1 wherein the difference between driver demand for power and road-load power is normalized.

3. A method for controlling an engine power demand in a hybrid electric vehicle having an engine with an electronic control unit, a generator, a motor, a battery and gearing establishing a mechanical power flow path from the engine to vehicle traction wheels and an electro-mechanical power flow path to the vehicle traction wheels, the method comprising:
   receiving in the electronic control unit a battery state-of-charge (SOC) and a driver demand for power at the traction wheels;
   calculating a control filter constant in the electronic control unit that is a based on road-load power;
   filtering the driver demand for power using the calculated control filter constant to obtain a filtered driver demand for power;
   calculating a battery power request within limits for the battery state-of-charge; and
   computing an engine power demand as a function of the filtered driver demand for power and the battery power request.

4. The method set forth in claim 3 wherein the step of computing an engine power demand includes subtracting a battery power discharge from a filtered driver demand for power request and adding estimated power losses to obtain a total engine power demand.

5. The method set forth in claim 3 wherein the control filter constant is computed during repetitive time steps of the electronic control unit by normalizing the driver demand for power during a time interval corresponding to a steady-state operating mode of the vehicle, the filter constant providing a fast filtering characteristic during a vehicle acceleration mode and during a vehicle deceleration mode and providing a slow filtering characteristic during the vehicle steady-state operating mode.

6. A method for controlling an engine power demand in a hybrid electric vehicle having an engine with an electronic control unit, a generator, a motor, a battery and gearing establishing a mechanical power flow path from the engine to vehicle traction wheels and an electro-mechanical power flow path to the vehicle traction wheels, the method comprising:
   calculating a control filter constant in the electronic control unit that is a function of road-load power;
   filtering a driver demand for power in the electronic control unit using the calculated control filter constant to obtain a filtered driver demand for power;
   computing a maximum power for filtering the driver demand for power at the traction wheels during a steady-state vehicle operating mode;
   calculating a battery power request within limits for a battery state-of-charge; and
   computing an engine power demand as a function of the filtered driver demand for power and the battery power request to attenuate excursions of a driver demand for power to improve engine response to vehicle acceleration and deceleration requests and to reduce engine speed variations during a steady-state vehicle operating mode.

7. The method set forth in claim 6 wherein the maximum power for filtering is a function of at least one of a battery state-of-charge and a battery state-of-charge limit.

8. The method set forth in claim 6 wherein the step of computing an engine power demand includes adding a battery power charge request to a filtered driver demand for power and adding estimated power losses to obtain a total engine power demand.

9. The method set forth in claim 6 wherein the control filter constant is computed during repetitive time steps of the electronic control unit by normalizing the driver demand for power during a time interval corresponding to a steady-state operating mode of the vehicle, the filter constant providing a fast filtering characteristic during a vehicle acceleration mode and during a vehicle deceleration mode and providing a slow filtering characteristic during the vehicle steady-state operating mode.

10. A method for controlling an engine power demand in a hybrid electric vehicle having an engine with an electronic control unit, a generator, a motor, a battery and gearing establishing a mechanical power flow path from the engine to vehicle traction wheels and an electro-mechanical power flow path to the vehicle traction wheels, the method comprising:
receiving a battery state of charge (SOC) and a driver demand for power at the traction wheels within the electronic control unit;
calculating a control filter constant based on road-load power;
filtering the driver demand for power in the electronic control unit using the calculated control filter constant to obtain a filtered driver demand for power;
computing, within a limit for battery state-of-charge, a maximum power for filtering the driver demand for power at the traction wheels during a steady-state vehicle operating mode;
computing, within a limit for battery state-of-charge, a minimum power for filtering the driver demand for power at the wheels during the steady-state vehicle operating mode;
the maximum power for filtering and the minimum power for filtering being respectively greater and less than the road-load power at a given instant in the steady-state operating mode;
calculating a battery power request; and
computing an engine power demand based on the filtered driver demand for power and the battery power request.

11. The method set forth in claim 10 wherein the minimum power for filtering is a function of at least one of a battery state-of-charge and a battery discharge limit.

12. The method set forth in claim 10 wherein the control filter constant is computed during repetitive time steps of the electronic control unit by normalizing the driver demand for power during a time interval corresponding to a steady-state operating mode of the vehicle, the filter constant providing a fast filtering characteristic during a vehicle acceleration mode and during a vehicle deceleration mode and providing a slow filtering characteristic during the vehicle steady-state operating mode.

13. A hybrid vehicle comprising:
an engine;
a traction battery; and
a controller configured to control engine power by filtering driver power demand using a filter constant that changes within available traction battery power constraints based on a difference between driver demand for power and road-load power during steady-state vehicle operation while a driver attempts to maintain constant vehicle speed.

14. A hybrid vehicle having an engine, a motor, and a traction battery, comprising:
a microprocessor-based controller configured to control the engine in response to a driver power demand filtered using a filter constant that is a normalized function of a difference between driver power demand and road load during steady-state vehicle operation when power demand is less than a maximum power demand and greater than a minimum power demand.

* * * * *